No. 722,368. PATENTED MAR. 10, 1903.
W. LEE & W. McMURRAY.
APPARATUS FOR THE AUTOMATIC PRODUCTION AND THE DELIVERY
OF AERATED WATERS.
APPLICATION FILED JULY 9, 1901.
NO MODEL.
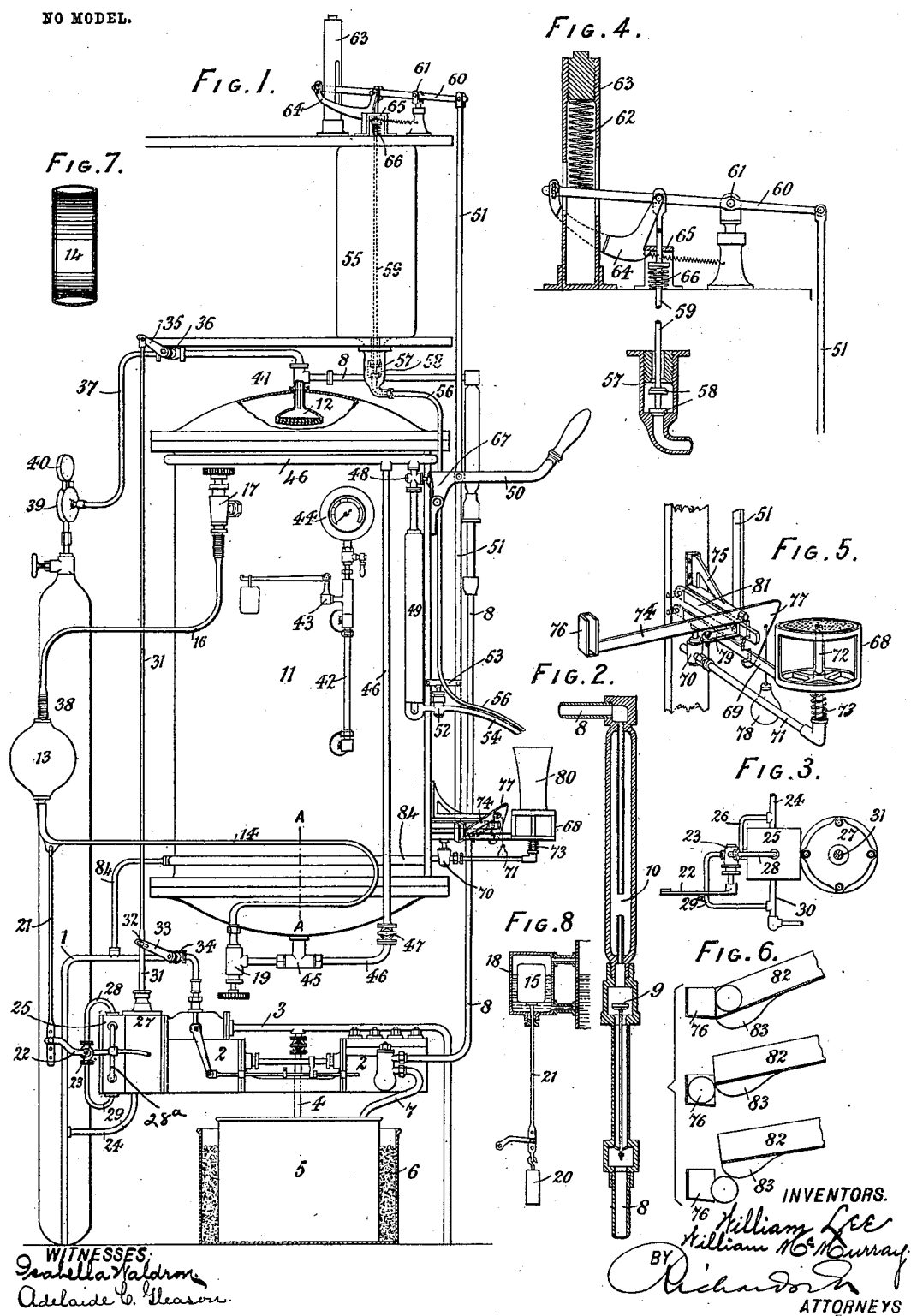
INVENTORS.
William Lee
William McMurray
BY Richardson
ATTORNEYS
WITNESSES:
Isabella Waldron
Adelaide C. Gleason

UNITED STATES PATENT OFFICE.

WILLIAM LEE AND WILLIAM McMURRAY, OF GLASGOW, SCOTLAND.

APPARATUS FOR THE AUTOMATIC PRODUCTION AND THE DELIVERY OF AERATED WATERS.

SPECIFICATION forming part of Letters Patent No. 722,368, dated March 10, 1903.

Application filed July 9, 1901. Serial No. 67,631. (No model.)

*To all whom it may concern:*

Be it known that we, WILLIAM LEE and WILLIAM McMURRAY, restaurateurs, subjects of the King of Great Britain and Ireland, residing at Glasgow, Scotland, have invented certain new and useful Improvements in Apparatus for the Automatic Production and the Delivery of Aerated Waters, (for which an application for a patent has been made in Great Britain, No. 13,099, dated June 27, 1901,) of which the following is a specification.

The objects of this invention are improvements in and relating to apparatus for the automatic production and the delivery in measured quantities of aerated waters, in which the production is automatically effected in proportion to the delivery by the use of water taken from any main of pressure-supply and the delivery of the aerated waters in measured quantities is effected by coin-freed mechanism or otherwise.

Referring to the drawings which form part of this specification, Figure 1 is an elevation of the apparatus, while Figs. 2 to 7 are views, to an enlarged scale, of certain details; and Fig. 8 is another arrangement of appliances for opening and closing the water-supply.

It is to be understood that while for clearness of illustration the apparatus is shown as fitted for the supply of aerated water of one variety only by multiplying the parts necessary for the flavoring and delivering in measured quantities any desired number of varieties of aerated waters can be produced.

In carrying our invention into practice the water-supply, as shown in Fig. 1, is led from any main of pressure-supply by the pipe 1 to the hydraulic pump 2, which exhausts by the pipe 3 partly to waste or to any convenient drain. A portion of the exhaust-water is, however, led by the branch pipe 4 into the cistern 5, which may have filtering material in it and is preferably surrounded by an outer wall or casing 6, (shown in section,) forming a space which may be filled with ice or other refrigerating material. The water thus delivered into the cistern 5 is drawn by the suction-pipe 7 to the pump 2 and delivered by the pipe 8, fitted with the check-valve 9 and pressure regulator or equalizer 10, both shown in section in the enlarged view Fig. 2, into the interior of the aerating-cylinder 11, preferably of copper, silver-plated or otherwise lined inside, through the perforated rose 12 in the manner to be further described, the upper part of the cylinder 11 being broken away to show the rose 12.

In order to start the hydraulic pump 2 for the purpose of replenishing the aerating-cylinder 11 as the aerated waters are drawn off, the following appliances are used. A hollow ball 13 or like close vessel is mounted on the end of and in communication with the bent flattened tube 14, a section of which, taken on the line A A, is shown to an enlarged scale by Fig. 7 and is connected to the upper part of the cylinder 11 by a length of flexible tubing 16 by means of the stop-valve 17, to the outlet of which it is secured. The pipe 14 communicates with the lower part of the cylinder 11 through the stop-cock 19, to which it is secured, and the T-piece 45. A rod 21 is jointed to the tube 14 and to the end of the lever 22, which turns the four-way cock 23. (Shown also in the enlarged plan view, Fig. 3.) The water within the cylinder 11 under pressure of the gas or the gas entering the tube 14 has a tendency to straighten same, and so uphold the weight of the ball 13 when it is empty; but when it is filled with water as it rises in level within the cylinder 11 while the pump is in action the weight of the water overcomes the action of the pressure within the bent tube 14 and the ball descends to force down the rod 21 and operate the four-way cock 23 by the lever 22 to shut off the supply. The turning of this cock 23 allows water, which is led from the pipe 1 by the branch 24 to the valve-chest 25 and by a reduced branch 26 to the cock 23, which by this action is turned to the position to allow the water to flow from the pipe 26, through the cock and the pipe 29, into the bottom of the valve-chest 25 and lift a floating valve within same, so as to open a port connecting with the pipe 24 and leading to the upper part of the cylinder 27 above a piston therein to lower it. While the water is entering the upper part of the cylinder 27 it is exhausted from the lower part through the valve by the pipe 28ª and from above from the floating valve by the pipe 28 through the four-way cock 23 to the exhaust-pipe 29ª. The pipes 28 and 29, respectively, lead the water to and from the upper and lower parts of the valve-chest, and the pipe 29ª is the exhaust leading to a junction with the pipe 30, which is the exhaust-pipe from this cylinder 27. The piston within the cylinder 27 is connected to the rod 31, which is jointed at 32 to the lever 33, which opens and shuts the tap 34 on the feed-pipe 1, leading to the hydraulic pump. By these devices when the ball 13 is emptied it rises and the water is turned on to the hydraulic pump 2 to replenish the cylinder 11, and, vice versa, when the ball 13 fills up with water its weight overcomes the pressure within the flattened tube 14, causing it to descend, and the action being reversed the supply of the water to the hydraulic pump is cut off by the rod 21 acting on the cock 23 by its lever 22. Where the water-pressure of main supply is not sufficient to work the hydraulic pump, an electric or other motor may be employed, being set in action by means of the rod 21.

By another arrangement, as illustrated by Fig. 8, for regulating the water-supply instead of the ball 13 a float 15 within a close vessel 18, in communication at top and bottom with the gas and water spaces of the cylinder 11, is mounted on the top end of the rod 21, passing through a stuffing-box, and which is jointed to the lever 22 to operate the cock 23, and which rod has a weight 20 suspended to its lower end. As the water rises within the close vessel 18 the float draws up the rod 21 and operates the cock 23 by the lever 22 in an equivalent manner to that described to stop the pump, and, vice versa, when the float falls the pump is started. The rod 31 is also jointed to a lever 35, actuating a cock 36 on a pipe 37, leading from a cylinder 38 of compressed carbonic acid fitted with stop-cock and pressure-regulator 39 and pressure-gage 40. The gas passes by the pipe 37 and through a nozzle 41, placed in the center of the water-supply pipe 8, where it meets the water, and both are forced simultaneously through the perforations in the rose 12, the perforated plate of which is formed of metal of some thickness to give the desired spraying effect to properly impregnate the water with gas. The cylinder 11 is preferably fitted with a gage-glass 42, a safety-valve 43, and a pressure-gage 44, as indicated. The aerated water is forced by the internal pressure through the T-piece 45 at the bottom of the cylinder 11 and up the pipe 46, fitted with a stop-cock 47, from which it passes through the spring-valve 48, normally open, into the measuring and discharging vessel 49. From this vessel it is discharged by the pulling-down action of the handle and lever 50, lowering the rod 51, which causes the spring-valve 52 to be opened by the pressure thereon of the lever 53, when the contents of the cylinder will flow from the nozzle 54, while the valve 48 is closed by the action of its spring. Though shown and described as in the vertical position, the measuring vessel 49 may be placed in an inclined position and actuated in a similar manner. At the same time the lowering of the rod 51 also actuates the appliances for delivering a measured quantity of any prepared syrup from the vessel 55 through the pipe and nozzle 56 in the manner to be described.

Referring to Fig. 1 and enlarged view Fig. 4, the vessel 55, containing the prepared syrup, is mounted vertically and is fitted at its lower end with a measuring-cup 57, within which works a duplex valve 58, secured on a tubular rod 59, open below the valve and having holes formed in it at its upper end to allow the air to enter and facilitate the downflow of the syrup when the valve 58 is open. The opening of the valve for the downflow of the syrup from the measuring-cup 57 and the simultaneous closing of the lower end of syrup vessel 55 to prevent the passage of more syrup is effected by the lowering of the rod 51 when the handle 50 is depressed, all as follows: The rod 51 is jointed to a lever 60, fulcrumed at 61 and having its free end acted on by a reaction-spring 62, inclosed in a slotted casing 63. The free end of the lever 60 is also loosely jointed to one end of a crescent-shaped latch-piece 64, the other end of which is jointed to the fork on the top of the rod 59, through which the lever 60 passes. A projection or latch on the latch-piece 64 engages with the under side of the bridge-piece 65 and normally holds down the rod 59 against the action of the spring 66; but when the rod 51 is lowered the latch is disengaged from the bridge-piece 65 and the rod 59 is free to move up and actuate the valve 58, opening the outlet and closing the inlet of the measuring-cup 57. When the handle 50 is released, the action of the spring 62 on the end of the lever 60 raises the rod 51 and reverses the action, a spring being used to facilitate the return of the latch-piece 64 to its position engaging with the bridge-piece 65 and at the same time closes the outlet-valve 52 from measuring vessel 49 and opens the inlet-valve 48 by the pressure of the projection 67 of the hand-lever 50.

An arrangement for washing the glass or cup to receive the aerated water is illustrated by Fig. 1 and to an enlarged scale in Fig. 5 and consists of a frame 68, mounted on the end of a lever 69, pivoted on the framing, which lever bears on the top of a spring-valve 70, supplying water when opened by the downward pressure of the lever 69 to the pipe 71 with upturned nozzle 72, the water being supplied by a branch 84 from the main pipe 1. The glass or cup is placed mouth downward on the top of the frame 68, and being depressed against the spring 73 opens the valve 70 by its lever 69, when it is released from the notch of the plate 77 on insertion of a coin, as will be described, and allows the water to flow from the nozzle 72 to clean the glass, the water flowing to waste by means of a basin and drain. (Not shown in the drawings.)

All these operations for producing and delivering measured quantities of aerated waters can be effected without the use of coin-freed mechanism; but when desired the mechanism illustrated by Figs. 1, 5, and 6 is employed. This consists of a coin-actuated lever 74, fulcrumed on a bracket 75, secured to framing and formed at the one end with a coin-receptacle 76 and at its other end with a triangular plate 77, having two notches in its inner edge, the upper notch being partially beveled on its lower side, and a weight 78 is suspended to the lever to counterbalance the coin-receptacle 76 when empty. In its normal position before the insertion of a coin the lower notch of the plate 77 engages with the lever 69, carrying the frame 68, and the upper notch engages with the rod or bar 81, which is pivoted on the frame and jointed to the lower end of the rod 51, so that both the lever 69 and the rod 51 are prevented from moving. On the insertion of a coin the lever falls till it rests on the adjusting-screw on the bar 79, and this movement releases the lever 69 from its notch and permits of the washing of the glass or cup 80, Fig. 1. The bar 81, pivoted on the framing and jointed to the lower end of the rod 51, is now resting on the beveled part of the upper notch, so that when the rod 51 is lowered by the handle 50 the bar 81 slides down the beveled edge and allows the lever 74 to tilt still more, so that the coin drops out of its receptacle in the manner illustrated by Fig. 6, which shows three positions of the coin-receptacle relative to the chute 82 by which the coin is inserted. In the first position the coin is shown as about to enter the receptacle 76, in the second the receptacle is lowered, but the coin is prevented falling out by the projection 83, while in the third position the receptacle is shown as having fallen farther and clear of the projection 83 and the coin falls out of the receptacle by gravity and the lever 74 returns to its normal position.

Though only one measuring and one syrup vessel and fittings are shown, as already stated, any number may be employed, and these may be fitted around a circular framing and inclosed by a hexagonal, octagonal, or other shaped casing, or they may be arranged side by side in a row and inclosed by a casing or in any suitable or convenient manner. Openings would be formed in such casings for the handle 50 and the nozzles 54 and 56 to protrude through, and ornamental mouthpieces and drip-basins may be fitted on the casings which would also have slits for the insertion of coins when the coin-freed appliances are used.

What we claim as our invention, and desire to secure by Letters Patent, is—

1. In apparatus for the automatic production of aerated water proportionately to delivery, and the delivery of the same in measured quantities by hand-operated devices, the combination with an aerating vessel, of a hydraulic pump delivering water thereto from a main of pressure-water supply, regulating mechanism therefor, a cylinder of compressed carbonic-acid gas for delivering gas to the aerating-cylinder through a mixing-nozzle and a rose, a measuring and delivering vessel, and a syrup vessel, a duplex measuring-valve and a hand-actuated rod and lever mechanism for operating the valves of both vessels, substantially as described.

2. In apparatus for the automatic production of aerated water proportionately to delivery, and the delivery of the same in measured quantities, the combination with an aerating vessel, of a hydraulic pump delivering water thereto from a main of pressure-water supply, regulating mechanism therefor, a cylinder of comprsssed carbonic-acid gas for delivering gas to the aerating-cylinder through a mixing-nozzle and a rose, a measuring and delivering vessel, and a syrup vessel, a duplex measuring-valve and a hand-actuated rod and lever mechanism for operating the valves of both vessels, substantially as described.

3. In apparatus for the automatic production of aerated waters proportionately to delivery, the combination of the hydraulic pump 2 actuated by pressure-water conveyed from a supply-main by the pipe 1, and delivering a portion of the same from the exhaust to an aerating-cylinder 11, the regulating means comprising a ball 13 in communication with the gas and water spaces of cylinder 11 and carried on a bent flattened tube 14, a rod 21, a lever 22, a four-way cock 23, a valve-chest 25, a cylinder 27 and valves 34 and 36 and connecting mechanism, substantially as described.

4. An apparatus for the production of aerated waters and their delivery in measured quantities, the combination with aerating and delivering appliances, of the flavoring-syrup vessel 55, fitted with a measuring-cup 57, a duplex valve 58, a delivering tube and nozzle 56, and actuated from the hand-lever 50 by rod 51, lever 60, tubular rod 59, latch-piece 64 and spring 62, substantially as described.

5. In apparatus for the automatic production of aerated waters, the combination with the hydraulic pump 2 actuated from a main of pressure-water supply, of the hollow vessel 13, the bent flattened tube 14, the lever 22 actuating the four-way cock 23, the cylinder 27, the piston reciprocating therein, taps 34 and 36 opened and closed by the movement of said piston, a hydraulic pump, a carbonic-acid-gas reservoir 38, a mixing-nozzle 41, the opening and closing of said taps admitting pressure-water to the hydraulic pump and the carbonic-acid gas from the reservoir 38 to the nozzle 41, substantially as described.

6. In apparatus for the production and delivery in measured quantities of aerated waters, the combination comprising the syrup vessel 55, the measuring-cup with duplex valve 58, the tubular rod 59 jointed to the lever 60 which is jointed to rod 51, the latch-piece 64 for holding down the rod 59, and reaction-spring 62, substantially as described.

7. In apparatus for the automatic production of aerated waters, proportionately to delivery, in combination with the main cylinder, an exterior hollow vessel 13, mounted on the end of a bent flattened tube 14 and communicating with the lower and upper parts of said cylinder by means of said flattened tube 14, a flexible tube 16, a hydraulic pump, and a rod 21 acting on the lever 22 and four-way cock 23, substantially as described.

8. In apparatus for the automatic production of aerated waters, proportionately to delivery, the means for controlling the hydraulic pump comprising the combination of the lever 22, the ball 13 and rod 21 acting on said lever, the four-way cock 23, the valve-chest 25, and the piston within the cylinder 27 operating the rod 31 to open and close the water and gas cocks 34 and 36, substantially as described.

In testimony whereof we have signed our names to this specification in the presence of two subscribing witnesses.

WILLIAM LEE.
WM. McMURRAY.

Witnesses:
R. C. THOMSON,
WM. RUTHERFORD.